United States Patent
Tuen et al.

(10) Patent No.: US 9,065,273 B2
(45) Date of Patent: Jun. 23, 2015

(54) POWER ADAPTOR

(71) Applicant: Wistron Corporation, New Taipei (TW)

(72) Inventors: Lung-Fai Tuen, New Taipei (TW); Chiu-Hsien Chang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 177 days.

(21) Appl. No.: 13/896,298

(22) Filed: May 16, 2013

(65) Prior Publication Data

US 2014/0049863 A1    Feb. 20, 2014

(30) Foreign Application Priority Data

Aug. 17, 2012   (TW) .............................. 101129919 A

(51) Int. Cl.
*H02H 9/04* (2006.01)

(52) U.S. Cl.
CPC *H02H 9/043* (2013.01); *H02H 9/04* (2013.01)

(58) Field of Classification Search
CPC .................................. H02H 9/043; H02H 9/04
USPC .......................................................... 361/56
See application file for complete search history.

(56) References Cited

U.S. PATENT DOCUMENTS

| | | | |
|---|---|---|---|
| 5,892,669 A * | 4/1999 | Shin | 363/50 |
| 8,320,095 B2 | 11/2012 | Chang | |
| 2004/0062067 A1* | 4/2004 | Su et al. | 363/146 |
| 2007/0138971 A1 | 6/2007 | Chen | |
| 2013/0014385 A1 | 1/2013 | Xu | |

FOREIGN PATENT DOCUMENTS

| | | |
|---|---|---|
| CN | 2930191 Y | 8/2007 |
| CN | 202127357 U | 1/2012 |
| TW | M396476 | 1/2011 |

OTHER PUBLICATIONS

Office action mailed on Apr. 22, 2014 for the Taiwan application No. 101129919, filing date: Aug. 17, 2012, p. 2 line 6-26 and p. 3 line 1-23.

* cited by examiner

*Primary Examiner* — Scott Bauer
(74) *Attorney, Agent, or Firm* — Winston Hsu; Scott Margo

(57) ABSTRACT

A power adaptor for converting an alternating voltage into a direct voltage to a load is disclosed. The power adaptor includes a primary side circuit including a hot line, a neutral line for receiving the alternating voltage, and a return terminal, a secondary side circuit including a positive output terminal and a negative output terminal for outputting the direct voltage, and a protection circuit including a first non-linear resistor coupled to the return terminal of the primary side circuit and the negative output terminal of the secondary side circuit forming an electrostatic discharge path for an electrostatic current generated by the load.

9 Claims, 4 Drawing Sheets

POWER ADAPTOR

BACKGROUND OF THE INVENTION

1. Field of the Invention

The present invention relates to a power adaptor, and more particularly, to a power adaptor capable of providing a discharge path for an electrostatic current to improve an electrostatic discharge tolerance of electronic products.

2. Description of the Prior Art

When an electronic product suffers ESD (ElectroStatic Discharge) effect, it may cause malfunctions or permanent damages to electronic components inside the electronic product if the ESD effect brings a great electrostatic current or voltage.

Thus, most governments promulgate related regulations and standard test procedures for ensuring an ESD tolerance and safety of the electronic product. For example, the test procedures to simulate the ESD effect happening between a human body and the electronic product includes air discharge, contact discharge and horizontal/vertical coupling plate discharge. The contact discharge is to simulate the ESD effect induced by a human body directly or indirectly contacting the electronic product. During the ESD test procedure, an operator applies electrostatic voltages to metal parts of the electronic sample product using an electrostatic gun; the electrostatic voltages may have positive polarity or negative polarity and normally kilo-volts.

Moreover, during the ESD test procedure, the electronic sample product is connected to a power adaptor to simulate a normal usage of the electronic product. In such a situation, the power adaptor may be a discharge path for the electrostatic current to prevent the electric component inside the product from being damaged by the electrostatic current accumulating in the electronic product. In other words, the ESD tolerance of the electronic product can be directly influenced by whether the power adaptor can provide the discharge path for the electrostatic current.

Therefore, there is a need to design a power adaptor capable of providing a discharge path for the electrostatic current to protect the electronic product from being damaged by the electrostatic current and improve the safety of the electronic product.

SUMMARY OF THE INVENTION

It is therefore an object of the present invention to provide a power adaptor capable of forming an electrostatic discharge path for an electrostatic current to improve electrostatic discharge tolerance of electronic devices.

The present invention discloses a power adaptor for converting an alternating voltage into a direct voltage to a load, comprising a primary side circuit including a hot line, a neutral line for receiving the alternating voltage, and a return terminal, a secondary side circuit including a positive output terminal and a negative output terminal for outputting the direct voltage, and a protection circuit including a first non-linear resistor coupled to the return terminal of the primary side circuit and the negative output terminal of the secondary side circuit forming an electrostatic discharge path for an electrostatic current generated by the load.

These and other objectives of the present invention will no doubt become obvious to those of ordinary skill in the art after reading the following detailed description of the preferred embodiment that is illustrated in the various figures and drawings.

DETAILED DESCRIPTION

There are two types of commonly used power adaptors, one of which includes two power input pins and the other includes two power input pins and a ground pin. The following description is separated into two parts according to the two types of the power adaptors.

Figure 1:
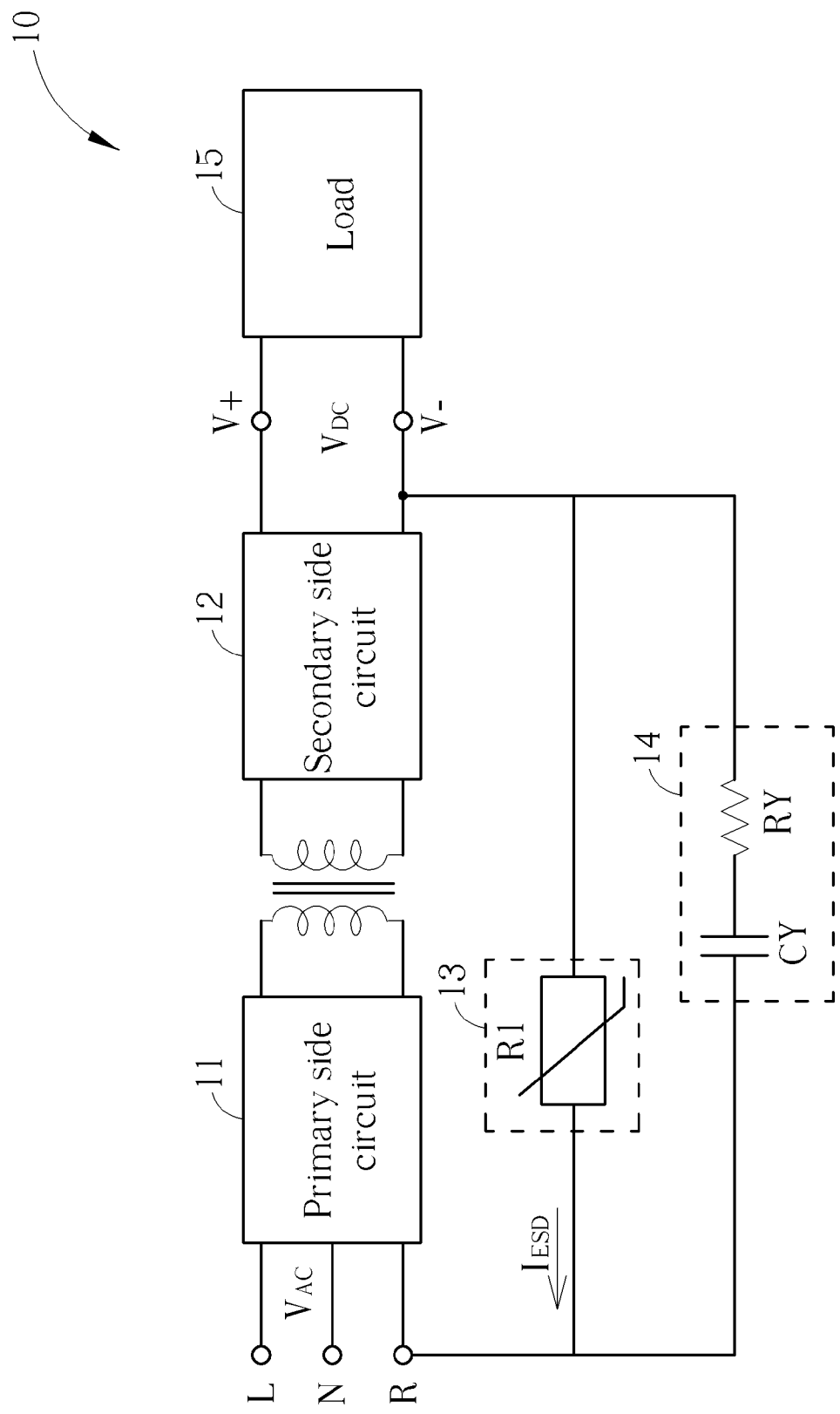
FIG. 1 is a schematic diagram of a power adaptor according to an embodiment of the present invention.

For the power adaptor including two power input pins, please refer to FIG. 1, which is a schematic diagram of a power adaptor 10 according to an embodiment of the present invention. The power adaptor 10 can be a Flyback power adaptor for converting an alternating voltage $V_{AC}$ into a direct voltage $V_{DC}$ to a load 15. The load 15 may be any electronic device powered by direct voltages, such as household appliances, personal computers or large electronic equipments.

As shown in FIG. 1, the power adaptor 10 includes a primary side circuit 11, a secondary side circuit 12, a protection circuit 13 and a feedback circuit 14. The primary side circuit 11 includes a hot line L, a neutral line N and a return terminal R. The secondary side circuit 12 includes a positive output terminal V+ and a negative output terminal V− for outputting the direct voltage $V_{DC}$. The hot line L and the neutral line N are used for receiving the alternating voltage $V_{AC}$. The primary side circuit 11 and the secondary side circuit 12 may cooperate with a transforming and a rectifying circuit (not shown in the FIG. 1) to convert the alternating voltage $V_{AC}$ into the direct voltage $V_{DC}$. The feedback circuit 14 includes a resistor RY and a Y-capacitor CY cascaded to each other. The feedback circuit 14 is coupled between the return terminal R and the negative output terminal V− for improving a Common Mode Interference between the primary side circuit 11 and the secondary side circuit 12 to enhance an EMI (ElectroMegnatic Interference) tolerance of the power adaptor 10. The protection circuit 13 is paralleled to the feedback circuit 14 for forming an electrostatic discharge path for an electrostatic current $I_{ESD}$ generated by the load 15, so as to reduce a possibility of the electrostatic current $I_{ESD}$ damaging the load 15, which achieves electrostatic protection to the load 15.

In detail, the protection circuit 13 includes a non-linear resistor R1, which is an electronic component having obviously Non-Ohmic conductor properties. A resistance of the non-linear resistor R1 is varied according to its applied voltage, such that a current-voltage characteristic curve of the non-linear resistor R1 appears obviously non-linear. In normal usage, the non-linear resistor R1 has a high impedance so that the primary side circuit 11 is opened from the secondary side circuit 12, which avoids noise voltages or currents flowing from the load 15 to the primary side circuit 11, and vice versa. In another case, when the load 15 suffers the ESD effect and the electrostatic current $I_{ESD}$ is generated, the resistance of the non-linear resistor R1 greatly reduced to form a bypass discharge path for the electrostatic current $I_{ESD}$, which may protect the electronic components inside the load 15 from damage by the electrostatic current $I_{ESD}$. Furthermore, the non-linear resistor R1 may be a Metal Oxide Varistor or a Transient Voltage Suppressor.

Figure 2:
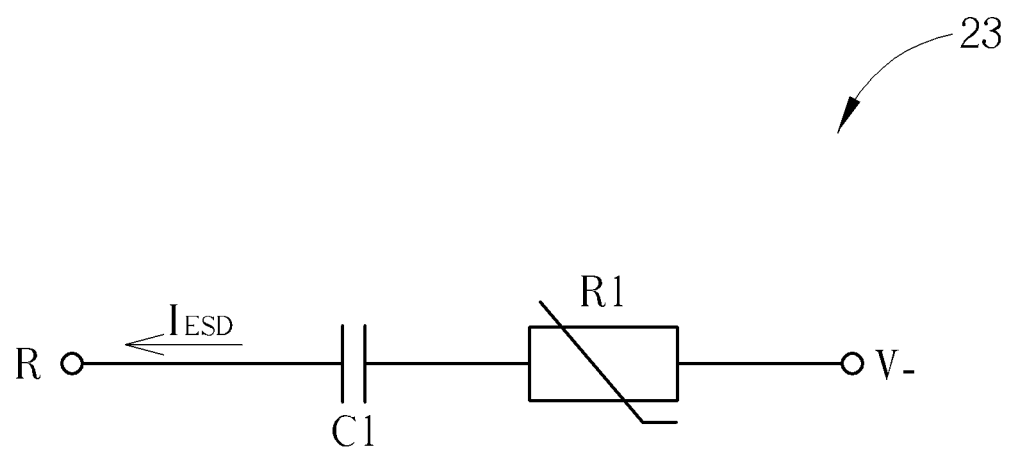
FIG. 2 is a schematic diagram of a protection circuit according to another embodiment of the present invention.

Please refer to FIG. 2, which is a schematic diagram of a protection circuit 23 according to another embodiment of the present invention. The protection circuit 23 may be substituted for the protection circuit 13, the protection circuit 23 further includes a capacitor C1 for performing frequency selection to the electrostatic current $I_{ESD}$, such that the protection circuit 23 may provide a better discharge path for the electrostatic current $I_{ESD}$ corresponding to a specific frequency range, and may also prevent unnecessary noise current from flowing into the return terminal R.

Simply speaking, the embodiment adds the protection circuit 13 or 23 paralleled to the feedback circuit 14 between the primary side circuit 11 and the secondary side circuit 12, such that the protection circuit 13 or 23 may form the discharge path for electrostatic current $I_{ESD}$ when the load 15 suffers the ESD effect, which protects electronic components of the load 15 from being damaged by the electrostatic current $I_{ESD}$. Further more, the capacitor C1 of the protection circuit 23 may provide a better discharge path for the electrostatic current $I_{ESD}$ corresponding to a specific frequency range, and prevent unnecessary noise currents form flowing into the return terminal R as well.

Figure 3:
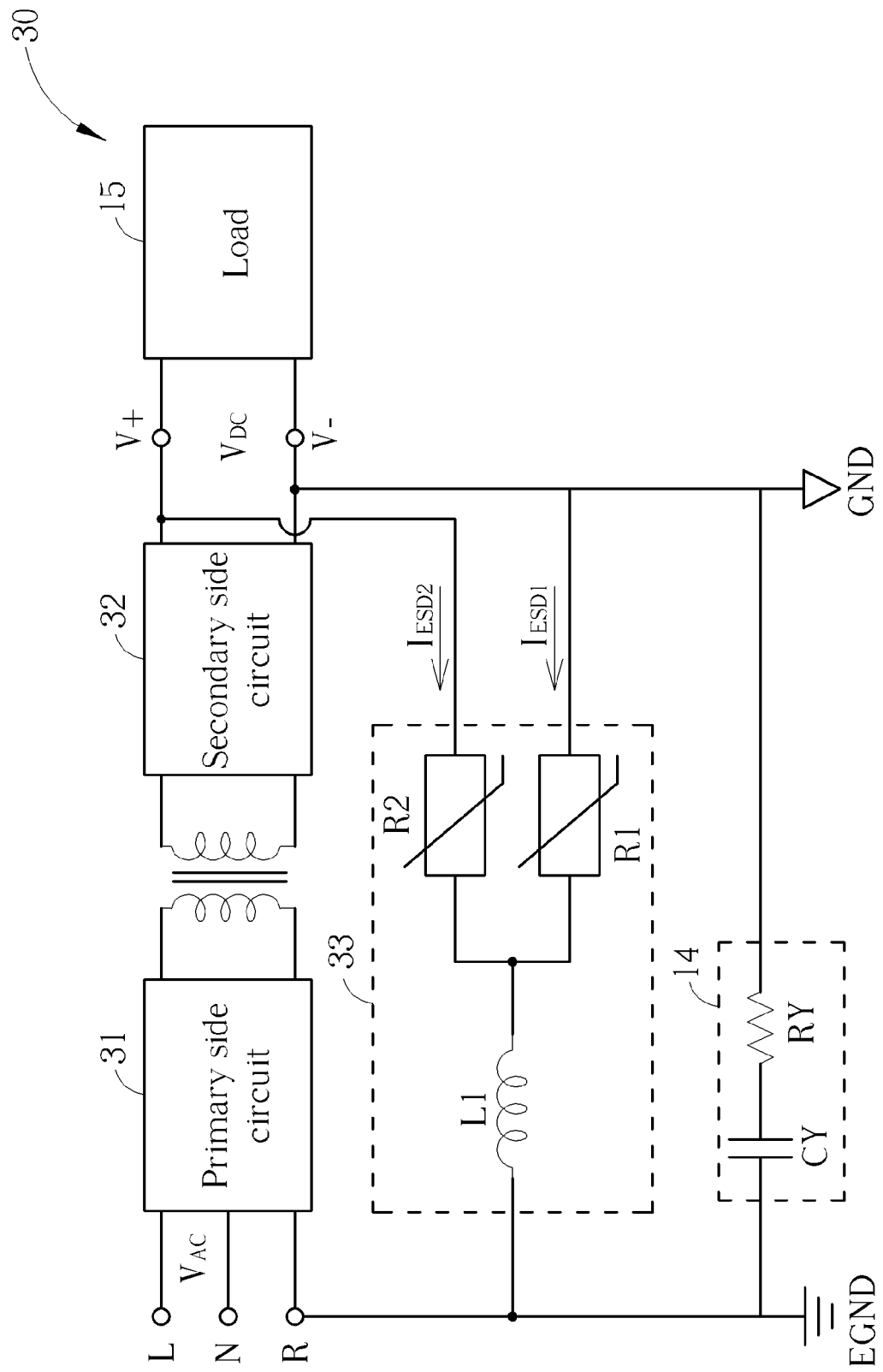
FIG. 3 is a schematic diagram of a power adaptor according to an embodiment of the present invention.

On the other hand, for the power adaptor including two power pins and a ground pin, please refer to FIG. 3, which is a schematic diagram of a power adaptor 30 according to an embodiment of the present invention. The power adaptor 30 includes a primary side circuit 31, a secondary side circuit 32, a protection circuit 33 and the feedback circuit 14. Structures of the power adaptors 10 and 30 are similar, a difference between the power adaptors 10 and 30 is that the return terminal R of the power adaptor 30 is coupled to an earth ground EGND. The return terminal R of the power adaptor 10 may be used for inputting signals associated with the direct voltage $V_{DC}$ to a control IC, which is not shown in FIG. 1, inside the primary side circuit 11, so as to control an operation of the primary side circuit 11 accordingly. Thus, internal circuits, i.e. the first and secondary side circuits, of the power adaptors are different, and the corresponding ESD standard test procedures are different. As a result, it is needed to design different protection circuits to meet the practical requirement.

As shown in FIG. 3, the protection circuit 33 is coupled to the positive output terminal V+, the negative output terminal V− and the return terminal R. The protection circuit 33 includes non-linear resistors R1 and R2 and an inductive component L1. The non-linear resistor R1 is coupled between the negative output terminal V− and the inductive component L1, the non-linear resistor R2 is coupled between the positive output terminal V+ and the inductive component L1, another end of the inductive component L1 is coupled to the return terminal R, i.e. the earth ground EGND. The negative output terminal V− may be regarded as a system ground GND of the load 15, and the feedback circuit 14 may be regarded as coupling between the earth ground EGND and the system ground GND.

In such a structure, when an electrostatic voltage having a positive polarity is applied to the load 15, an electrostatic current $I_{ESD1}$ having a positive polarity may flow to the negative output terminal V−, pass through the non-linear resistor R1 and the inductive component L1, and finally the earth ground EGND. On the other hand, when an electrostatic voltage having a negative polarity is applied to the load 15, an electrostatic current $I_{ESD2}$ having a negative polarity may flow to the positive output terminal V+, pass through non-linear resistor R2 and the inductive component L1, and finally the earth ground EGND. As a result, the protection circuit 33 may provide different discharge paths corresponding to the electrostatic currents $I_{ESD1}$ and $I_{ESD2}$ having the positive and negative polarities so as to improve the ESD tolerance of electronic products.

Figure 4:
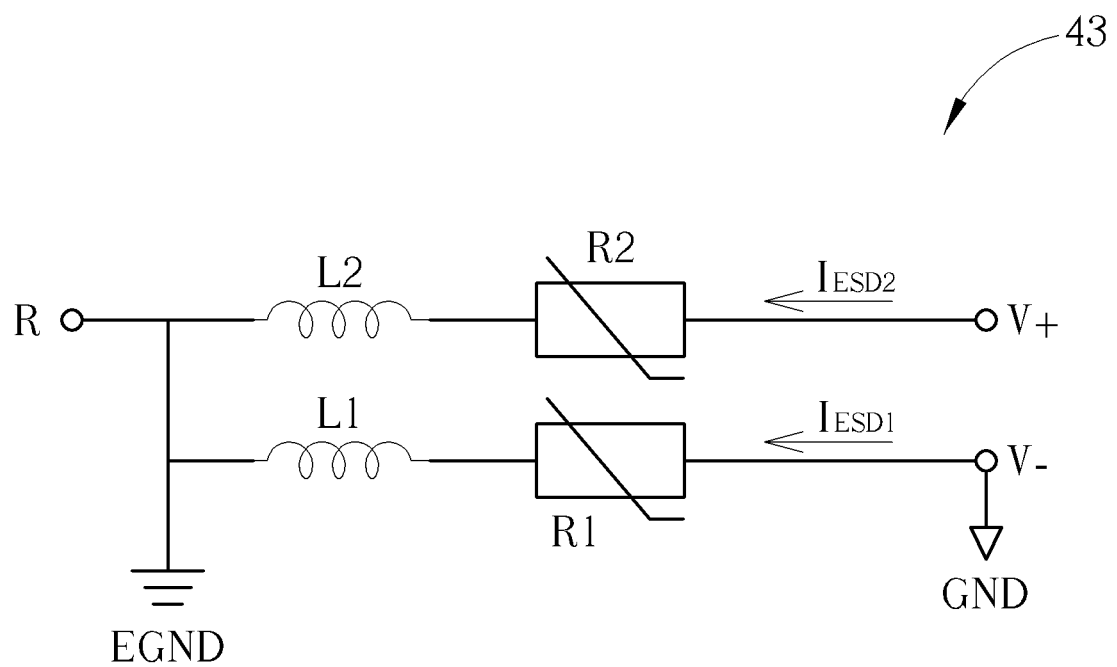
FIG. 4 is a schematic diagram of a protection circuit according to another embodiment of the present invention.

Please refer to FIG. 4, which is a schematic diagram of a protection circuit 43 according to another embodiment of the present invention. The protection circuit 43 may be substituted for the protection circuit 33, the protection circuit 34 further includes an inductive component L2 coupled between the non-linear resistor R2 and the earth ground EGND, and the inductive component L1 is coupled between the non-linear resistor R1 and the earth ground EGND. In such a structure, the electrostatic current $I_{ESD1}$ having the positive polarity may flow to the non-linear resistor R1, the inductive component L1 and finally the earth ground EGND. The electrostatic current $I_{ESD2}$ having the negative polarity may flow to the non-linear resistor R2, the inductive component L2, and finally the earth ground EGND.

Noticeably, the inductive components L1, L2 may be inductors, beads or ferrite cores, which are used in the protection circuit 33 or 43 mainly for blocking noise currents from the earth ground EGND. When the discharge path is formed, the inductive components L1, L2 may prevent the noise current from flowing in the positive output terminal V+ or the negative output terminal V−, which protects the load 15 from being damaged by the noise current. Besides, designers may select the inductive components L1 and L2 corresponding to different characteristics curve to provide suitable discharge paths for the electrostatic currents $I_{ESD1}$ and $I_{ESD2}$, or block the noise current having a specific frequency range.

In short, the present invention utilizes the protection circuit 33 or 43 coupled between the return terminal R, i.e. the earth ground EGND, the positive output terminal V+ and the negative output terminal V− of the secondary side circuit 32. When the load 15 is applied by the electrostatic having different polarities, the electrostatic current $I_{ESD1}$ having the positive polarity and the electrostatic current $I_{ESD2}$ having the negative polarity may flow to the earth ground EGND through different discharge paths, which achieves electrostatic protection. Besides, the inductive components L1 and L2 of the protection circuits 33 and 43 may be used for blocking the noise current from the earth ground EGND, which protects the load 15 from being damaged by the noise current flowing into the positive output terminal V+ or the negative output terminal V−.

To sum up, since the ESD tolerance of the electronic products is directly influenced by whether the power adaptor can provide the discharge path for the electrostatic current, the present invention designs different protection circuits for different types of the power adaptors. For the power adaptor 10 without connecting to the earth ground EGND, the protection circuit 13 or 23 is cascaded between the negative output terminal V− and the return terminal R to form the discharge path for the electrostatic current. On the other hand, for the power adaptor 30 connecting the earth ground, the protection circuit 33 or 43 is coupled to the earth ground EGND, the positive output terminal V+ and the negative output terminal V−, such that the electrostatic current $I_{ESD1}$ having the positive polarity and the electrostatic current $I_{ESD2}$ having the negative polarity may respectively flow to different discharge paths to the earth ground EGND, which achieves electrostatic protection. As a result, the present invention may provide the suitable discharge path for electrostatic current when the electronic product suffers the ESD effect, which protects the electronic components from being damaged by the electrostatic current and improve the safety of the electronic product.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power adaptor for converting an alternating voltage into a direct voltage to a load, comprising:
   a primary side circuit including a hot line, a neutral line for receiving the alternating voltage, and a return terminal;
   a secondary side circuit including a positive output terminal and a negative output terminal for outputting the direct voltage; and
   a protection circuit including a first non-linear resistor coupled to the return terminal of the primary side circuit and the negative output terminal of the secondary side circuit forming an electrostatic discharge path for an electrostatic current generated by the load.

2. The power adaptor of claim 1, wherein the protection circuit further comprises a capacitor cascaded between the first non-linear resistor and the return terminal of the primary side circuit.

3. The power adaptor of claim 1, wherein the return terminal of the primary side circuit is coupled to an earth ground, and the negative output terminal is coupled to a system ground of the load.

4. The power adaptor of claim 3, wherein the protection circuit further comprises:
   a second non-linear resistor coupled to the positive output terminal of the secondary side circuit; and
   an inductive component including one end coupled to the return terminal of the primary side circuit, another end coupled to the first non-linear resistor and the second non-linear resistor.

5. The power adaptor of claim 3, wherein the protection circuit further comprises:
   a second non-linear resistor coupled to the positive output terminal of the secondary side circuit;
   a first inductive component including one end coupled to the return terminal of the primary side circuit, another end coupled to the first non-linear resistor; and
   a second inductive component including one end coupled to the return terminal of the primary side circuit, another end coupled to the second non-linear resistor.

6. The power adaptor of claim 5, wherein the first inductive component and the second inductive component is an inductor, a bead or a ferrite core for blocking a noise current generated from the return terminal flowing to the negative output terminal and the positive output terminal of the secondary side circuit, respectively.

7. The power adaptor of claim 1, further comprising a feedback circuit comprising:
   a resistor coupled to the negative output terminal; and
   a Y-capacitor coupled between the resistor and the return terminal;
   wherein the protection circuit is paralleled to the feedback circuit.

8. The power adaptor of claim 1, wherein the first non-linear resistor is a Metal Oxide Varistor or a Transient Voltage Suppressor.

9. The power adaptor of claim 1, which is a Flyback power adaptor.

* * * * *